3,147,273
CERTAIN 2H - ISOTHIAZOLO[4,5-b]INDOL - 3(4H)-ONE 1-OXIDE COMPOUNDS AND THEIR PREPARATION
Jacob Szmuszkovicz, Kalamazoo, Mich., assignor to The Upjohn Company, Kalamazoo, Mich., a corporation of Delaware
No Drawing. Filed May 2, 1963, Ser. No. 277,456
5 Claims. (Cl. 260—306.7)

This invention pertains to novel isothiazolo[4,5-b]indole compounds and to a novel process. More particularly, the invention pertains to novel 2H-isothiazolo[4,5-b]indol-3(4H)-one 1-oxides and to a novel process for preparing the same.

The 2H-isothiazolo[4,5-b]indol-3(4H)-one 1-oxides of the present invention are represented by the formula:

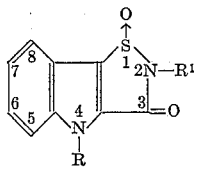

(I)

wherein R and $R^1$ are selected from the group consisting of hydrogen and alkyl of 1 to 4 carbon atoms, inclusive, e.g., methyl, ethyl, propyl, and butyl, and isomeric forms thereof. R and $R^1$ can be the same or different.

The novel compounds of Formula I are prepared by treating an indole-2-carboxamide having the formula:

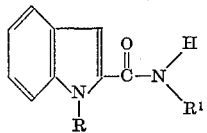

(II)

wherein R and $R^1$ have the above values, with thionyl chloride or thionyl bromide, preferably thionyl chloride. The reaction can be conveniently carried out by intimately mixing the thionyl halide and the amide of Formula II, and maintaining the reaction mixture between about 20° C. and about 30° C. until the reaction has been substantially completed. Ordinarily, a period of time ranging from a few minutes, e.g., about 4 or 5 minutes, up to about 1 hour will suffice, depending on the particular reactants. Stoichiometrically, the reaction requires equimolecular amounts of the reactants. It is preferred, however, to employ the thionyl halide in excess, such as 5 to 10 or even more molecular equivalents per molecular equivalent of the amide of Formula II, the excess thionyl halide in effect serving as an inert solvent or diluent. Alternatively, the reactants can be mixed in the presence of a different inert solvent or diluent (one which is unreactive toward both reactants), e.g., diethyl ether, chloroform, methylene chloride, ethylene dichloride, and the like, and, if desired, the amount of thionyl halide employed can be as low as the stoichiometric amount. It is preferred to carry out the reaction at temperatures ranging between about 0° C. and about 35° C., particularly between about 10° C. and about 30° C. Upon completion of the reaction, the 2H-isothiazolo[4,5-b]indol-3(4H)-one 1-oxide formed therein can be separated from any by-products which also may have been formed (in many instances the corresponding 3,3'-thiobis[indole-2-carboxamide] is formed as a by-product), such as by taking advantage of differential solubility in organic solvents such as diethyl ether, diisopropyl ether, and the like. The desired isothiazolo product can be further purified, if so desired, in accordance with conventional techniques such as recrystallization, chromatography, and the like.

The starting indole-2-carboxamides of Formula II, many of which are known, can be prepared by known procedures, for example, by means of the following sequence of reactions:

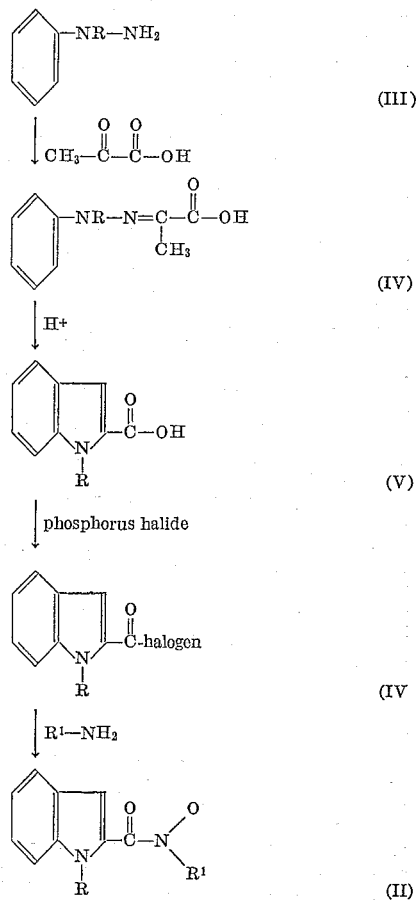

In the foregoing formulae, R and $R^1$ have the above values, and "halogen" is chlorine or bromine, preferably chlorine.

The phenylhydrazines of Formula III, which are well known and can be prepared by various procedures, are reacted with pyruvic acid to obtain the corresponding hydrazones of Formula IV. The hydrazone is cyclized in the presence of an acid medium (see Snyder et al., J. Am. Chem. Soc. 78,969, 1956), to obtain the corresponding indole-2-carboxylic acid of Formula V. The acid is converted to an indole-2-carbonyl halide of Formula VI, using procedures commonly employed for converting carboxylic acids to acid halides, e.g., by treatment with a phosphorus chloride or bromide. The procedure of Johnson et al., J. Am. Chem. Soc. 67, 423, 1945, which involves the use of phosphorus pentachloride in an ethereal medium, is particularly satisfactory. The indole-2-carbonyl halide is then converted to the desired indole-2-carboxamide of Formula II by amidation with a compound having the formula $R^1$—$NH_2$, examples of which are ammonia, methylamine, ethylamine, propylamine, isopropylamine, butylamine, isobutylamine, sec-butylamine, and tert-butylamine.

The novel 2H-isothiazolo[4,5-b]indol - 3(4H)-one 1-oxides of the invention have central nervous system depressant activity, and can be used to effect sedation and tranquilization in birds and animals, including humans. The compounds are also useful as muscle relaxants and have also demonstrated antifungal activity (e.g., against Trichophyton rubrum) and anti-inflammatory activity.

EXAMPLE 1

2,4-Dimethyl-2H-Isothiazolo[4,5-b]Indol-3(4H)-One 1-Oxide

Thionyl chloride (50 ml.; approximately 0.7 mole) was added all at once to N,1-dimethylindole-2-carboxamide. The resulting brown solution was allowed to stand at about 25° C. for 5 min. Anhydrous diethyl ether (750 ml.) was added, the resulting solution was allowed to stand for 30 min., and the 3,3'-thiobis[N,1-dimethylindole-2-carboxamide] which had crystallized was removed by filtration. The filtrate was allowed to stand for 16 hr. at about 25° C., during which time precipitation of a yellow solid occurred. The solid (10.2 g.; M.P. 180–190° C.) was crystallized from methanol. There was thus obtained 5.7 g. of 2,4-dimethyl-2H-isothiazolo-[4,5-b]indol - 3(4H) - one 1 - oxide as colorless needles which discolored at 150° C. and melted at 194–195° C. (with decomposition).

*Analysis.*—Calcd. for $C_{11}H_{10}N_2O_2S$: C, 56.39; H, 4.30; N, 11.96; S, 13.69. Found: C, 56.82; H, 4.60; N, 12.15; S, 13.88.

U.V. (in 95 percent ethanol): 213 m$\mu$ ($\epsilon=37,300$); 233 m$\mu$ ($\epsilon=23,200$); 262 m$\mu$ ($\epsilon=3,600$); 305 m$\mu$ ($\epsilon=8,300$).

I.R. (mineral oil mull): C=O 1705 cm.$^{-1}$; C=C 1540, 1500, 1485 cm.$^{-1}$.

Following the same procedure, but substituting indole-2-carboxamide,

N-isopropyl-1-methylindole-2-carboxamide,
N-butyl-1-methylindole-2-carboxamide,
N-sec-butyl-1-methylindole-2-carboxamide,
N,1-diethylindole-2-carboxamide,
N-ethyl-1-propylindole-2-carboxamide,
N,1-diisobutylindole-2-carboxamide,
N-methylindole-2-carboxamide,
N-butylindole-2-carboxamide,
1-methylindole-2-carboxamide, and
1-isopropylindole-2-carboxamide for N,1-dimethylindole-2-carboxamide, there are obtained 2H-isothiazolo[4,5-b]indol-3(4H)-one 1-oxide,
2-isopropyl-4-methyl-2H-isothiazolo[4,5-b]indol-3(4H)-one 1-oxide,
2-butyl-4-methyl-2H-isothiazolo[4,5-b]indol-3(4H)-one 1-oxide,
2-sec-butyl-4-methyl-2H-isothiazolo[4,5-b]indol-3(4H-one 1-oxide,
2,4-diethyl-2H-isothiazolo[4,5-b]indol-3(4H)-one 1-oxide,
2-ethyl-4-propyl-2H-isothiazolo[4,5-b]indol-3(4H)-one 1-oxide,
2,4-diisobutyl-2H-isothiazolo[4,5-b]indol-3(4H)-one 1-oxide
2-methyl-2H-isothiazolo[4,5-b]indol-3(4H)-one 1-oxide,
2-butyl-2H-isothiazolo[4,5-b]indol-3(4H)-one 1-oxide,
4-methyl-2H-isothiazolo[4,5-b]indol-3(4H)-one 1-oxide,
and 4-isopropyl-2H-isothiazolo[4,5-b]indol-3(4H)-one 1-oxide, respectively.

I claim:

1. A compound of the formula:

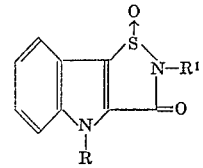

wherein each of R and R$^1$ is selected from the group consisting of hydrogen and alkyl of 1 to 4 carbon atoms, inclusive.

2. 2,4-dimethyl-2H-isothiazolo[4,5-b]indol-3(4H)-one 1-oxide.

3. A process for preparing a compound of the formula:

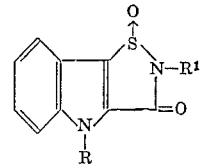

wherein each of R and R$^1$ is selected from the group consisting of hydrogen and alkyl, which comprises mixing a thionyl halide selected from the group consisting of thionyl chloride and thionyl bromide with an indole-2-carboxamide of the formula:

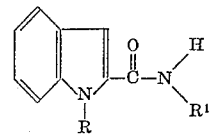

wherein R and R$^1$ have the above values.

4. The process of claim 3 in which the thionyl halide is thionyl chloride.

5. The process of claim 3 in which the indole-2-carboxamide is N,1-dimethylindole-2-carboxamide.

No references cited.